US007611406B2

(12) United States Patent
Fuller

(10) Patent No.: US 7,611,406 B2
(45) Date of Patent: Nov. 3, 2009

(54) GAMING DEVICE HAVING SELECTIVELY ACTIVATED EXTRA REEL

(75) Inventor: William S. Fuller, Reno, NV (US)

(73) Assignee: IGT, Reno, NV (US)

(*) Notice: Subject to any disclaimer, the term of this patent is extended or adjusted under 35 U.S.C. 154(b) by 339 days.

(21) Appl. No.: 10/924,515

(22) Filed: Aug. 23, 2004

(65) Prior Publication Data

US 2006/0040728 A1 Feb. 23, 2006

(51) Int. Cl.
*A63F 9/24* (2006.01)
*A63F 13/00* (2006.01)

(52) U.S. Cl. ............................ 463/20; 463/16; 463/17; 463/25; 463/29

(58) Field of Classification Search .................. 463/20, 463/16, 25, 29, 42; 273/138.1–2, 143 R
See application file for complete search history.

(56) References Cited

U.S. PATENT DOCUMENTS

| | | | | | |
|---|---|---|---|---|---|
| 3,642,287 | A * | 2/1972 | Lally et al. | .............. | 273/143 R |
| 4,448,419 | A | 5/1984 | Telnaes | | |
| 4,648,600 | A * | 3/1987 | Olliges | ........................ | 463/20 |
| 4,695,053 | A | 9/1987 | Vazquez, Jr. et al. | | |
| 4,838,552 | A | 6/1989 | Hagiwara | | |
| 4,991,848 | A | 2/1991 | Greenwood et al. | | |
| 5,152,529 | A * | 10/1992 | Okada | ......................... | 463/20 |
| 5,308,065 | A | 5/1994 | Bridgeman et al. | | |
| 5,332,228 | A | 7/1994 | Schultz | | |
| 5,393,061 | A | 2/1995 | Manship et al. | | |

(Continued)

FOREIGN PATENT DOCUMENTS

AU 199717602 B2 9/1997

(Continued)

OTHER PUBLICATIONS

Wild Streak Advertisement written by WMS Gaming, Inc., published in 2001.

(Continued)

*Primary Examiner*—John M. Hotaling, II
*Assistant Examiner*—Ryan Hsu
(74) *Attorney, Agent, or Firm*—K&L Gates LLP

(57) ABSTRACT

A gaming device including a plurality of primary reels with a plurality of symbols on each of the primary reels. At least one and preferably a plurality of the symbols on the primary reels are designated as activator symbols. An activator symbol is a symbol that, when generated on a primary reel, is adapted to cause the activation of at least one supplemental reel. The supplemental reel includes a plurality of supplemental symbols. After the primary reels spin to generate a plurality of symbols, the gaming device determines if an activator symbol is generated on the primary reels. If no activator symbol is generated on the primary reels, any award based on one of or a combination of the generated symbols is determined and any determined award is provided to the player. If an activator symbol is generated on the primary reels, the supplemental reel is activated and displayed to the player. The activated supplemental reel spins to generate a plurality of supplemental symbols. The gaming device determines if an award is associated with one of or a combination of the symbols generated from the primary reels and the supplemental symbols generated from the supplemental reel and provides any determined award to the player.

39 Claims, 10 Drawing Sheets

U.S. PATENT DOCUMENTS

| | | | |
|---|---|---|---|
| 5,423,539 A | 6/1995 | Nagao | |
| 5,449,173 A | 9/1995 | Thomas et al. | |
| 5,580,053 A | 12/1996 | Crouch | |
| 5,584,764 A | 12/1996 | Inoue | |
| 5,611,535 A | 3/1997 | Tiberio | |
| 5,722,891 A * | 3/1998 | Inoue | 463/20 |
| 5,769,716 A | 6/1998 | Saffari et al. | |
| 5,807,172 A | 9/1998 | Piechowiak | |
| 5,833,537 A * | 11/1998 | Barrie | 463/21 |
| 5,882,261 A | 3/1999 | Adams | |
| 5,890,962 A | 4/1999 | Takemoto | |
| 5,984,781 A | 11/1999 | Sunaga | |
| 5,984,782 A | 11/1999 | Inoue | |
| 6,004,207 A | 12/1999 | Wilson, Jr. et al. | |
| 6,033,307 A * | 3/2000 | Vancura | 463/20 |
| 6,059,658 A | 5/2000 | Mangano et al. | |
| 6,062,980 A | 5/2000 | Luciano | |
| 6,089,977 A | 7/2000 | Bennett | |
| 6,093,102 A | 7/2000 | Bennett | |
| 6,095,921 A | 8/2000 | Walker et al. | |
| 6,120,377 A | 9/2000 | McGinnis, Sr. et al. | |
| 6,120,378 A | 9/2000 | Moody et al. | |
| 6,126,542 A | 10/2000 | Fier | |
| 6,142,873 A | 11/2000 | Weiss et al. | |
| 6,155,925 A | 12/2000 | Giobbi et al. | |
| 6,159,095 A | 12/2000 | Frohm et al. | |
| 6,165,070 A * | 12/2000 | Nolte et al. | 463/20 |
| 6,174,233 B1 | 1/2001 | Sunaga et al. | |
| 6,186,894 B1 | 2/2001 | Mayeroff | |
| 6,190,254 B1 | 2/2001 | Bennett | |
| 6,200,217 B1 | 3/2001 | Osawa | |
| 6,224,483 B1 | 5/2001 | Mayeroff | |
| 6,227,971 B1 | 5/2001 | Weiss | |
| 6,231,442 B1 | 5/2001 | Mayeroff | |
| 6,234,897 B1 * | 5/2001 | Frohm et al. | 463/20 |
| 6,241,607 B1 | 6/2001 | Payne et al. | |
| 6,251,013 B1 | 6/2001 | Bennett | |
| 6,261,178 B1 | 7/2001 | Bennett | |
| 6,299,165 B1 | 10/2001 | Nagano | |
| 6,309,299 B1 | 10/2001 | Weiss | |
| 6,311,976 B1 | 11/2001 | Yoseloff et al. | |
| 6,328,649 B1 | 12/2001 | Randall et al. | |
| 6,336,860 B1 | 1/2002 | Webb | |
| 6,413,162 B1 | 7/2002 | Baerlocher et al. | |
| 6,419,579 B1 | 7/2002 | Bennett | |
| 6,439,993 B1 | 8/2002 | O'Halloran | |
| 6,494,454 B2 | 12/2002 | Adams | |
| 6,517,432 B1 | 2/2003 | Jaffe | |
| 6,544,120 B2 | 4/2003 | Ainsworth | |
| 6,547,242 B1 | 4/2003 | Sugiyama et al. | |
| 6,604,740 B1 * | 8/2003 | Singer et al. | 273/292 |
| 6,604,999 B2 | 8/2003 | Ainsworth | |
| 6,605,002 B2 | 8/2003 | Baerlocher | |
| 6,612,575 B1 * | 9/2003 | Cole et al. | 273/138.1 |
| 6,616,142 B2 | 9/2003 | Adams | |
| 6,632,140 B2 * | 10/2003 | Berman et al. | 463/18 |
| 6,634,945 B2 * | 10/2003 | Glavich et al. | 463/25 |
| 6,726,204 B2 * | 4/2004 | Inoue | 273/143 R |
| 6,866,583 B2 * | 3/2005 | Glavich et al. | 463/20 |
| 6,880,826 B2 * | 4/2005 | Inoue | 273/143 R |
| 6,910,962 B2 * | 6/2005 | Marks et al. | 463/16 |
| 6,921,335 B2 * | 7/2005 | Rodgers et al. | 463/30 |
| 6,960,133 B1 | 11/2005 | Marks et al. | |
| 7,001,274 B2 | 2/2006 | Baerlocher et al. | |
| 7,014,560 B2 * | 3/2006 | Glavich et al. | 463/20 |
| 7,056,213 B2 * | 6/2006 | Ching et al. | 463/20 |
| 7,070,502 B1 | 7/2006 | Bussick et al. | |
| 7,226,359 B2 | 6/2007 | Bussick et al. | |
| 2003/0073480 A1 | 4/2003 | Thomas et al. | |
| 2003/0203752 A1 | 10/2003 | Kaminkow et al. | |
| 2003/0203753 A1 | 10/2003 | Muir et al. | |
| 2003/0216165 A1 * | 11/2003 | Singer et al. | 463/20 |
| 2004/0012145 A1 * | 1/2004 | Inoue | 273/143 R |
| 2004/0048650 A1 | 3/2004 | Mierau et al. | |
| 2004/0058722 A1 | 3/2004 | Yang et al. | |
| 2004/0058727 A1 | 3/2004 | Marks et al. | |
| 2004/0192431 A1 | 9/2004 | Singer et al. | |
| 2004/0195773 A1 | 10/2004 | Masci et al. | |
| 2004/0242313 A1 | 12/2004 | Munoz | |
| 2006/0025210 A1 | 2/2006 | Johnson | |

FOREIGN PATENT DOCUMENTS

| | | |
|---|---|---|
| AU | 722969 | 6/1998 |
| AU | 19991731 A1 | 9/1999 |
| EP | 0984408 A2 | 3/2000 |
| EP | 1544811 | 6/2005 |
| GB | 2097160 | 10/1982 |
| GB | 2384097 | 7/2003 |
| WO | WO 9732285 | 9/1997 |
| WO | WO 00/66235 | 11/2000 |
| WO | WO 00/76606 A1 | 12/2000 |
| WO | WO2005010831 | 2/2005 |

OTHER PUBLICATIONS

Penguin Pays Advertisement written by Aristocrat Incorporated, published in 1998.
Black Swan Paytable Display written by IGT, published prior to 2001.
Jackpot Party Brochure and Articles written by WMS Gaming, Inc., published in 1988.
Enchanted Unicorn Advertisement written by IGT, published in 2001.
Introducing "Smiling Ape" Machine Advertisement (including Joker's Wild Poker description) written by IGT, published prior to 2001.
Description of Symbol Feature in Australian UFO Gaming Machine written by Barcrest Ltd., published in 1995.
Reel Magic™ Gaming Machine Descrption written by IGT, available in 1986.
Enchanted Forest™ Gaming Description from Aristocrat, available in 1994.
Happy Camper Advertisement written by IGT, published in 2001.
Fishin' Buddies Article published in Strictly Slots/Anchor Games, published in Apr. 2001.
Boot Scootin Article written by Strictly Slots/Aristocrat Leisure Industries, PTY Ltd., published datae unknown.
Little Green Men, Jr. Advertisement written by A.C. Coin and Slot Services Company, published prior to 2002.
Cash Chameleon Article written by Strictly Slots/Aristocrat Leisure Industires, PTY Ltd., published in 2001.
Loco Loot Article written by Strictly Slots/Aristocrat Leisure Industries, PTY Ltd., published in May 2002.
Mountain Money Article written by Strictly Slots/Aristocrat Leisure Industries, PTY Ltd., published in Apr. 2001.
Break the Spell Article written by Strictly Slots/Atronic Casino Technology, Ltd., published in Sep. 2000.
Break the Spell Atronic Web Page, published in Jan. 2001.
Break the Spell Brochure, published in 1999.
Double Diamond Line Advertisement written by Bally Gaming Systems, published in 2000.
Cossack Dance Advertisement written by Olympic Video Gaming, published prior to 2002.
Classic IGT Game Advertisement, written by IGT, available prior to Aug. 2004.

* cited by examiner

GAMING DEVICE HAVING SELECTIVELY ACTIVATED EXTRA REEL

CROSS-REFERENCE TO RELATED APPLICATIONS

This application is related to the following commonly-owned co-pending patent applications: "SLOT MACHINE GAME HAVING A PLURALITY OF WAYS FOR A USER TO OBTAIN PAYOUTS FOR ONE OR MORE ADDITIONAL PAY LINES FORMED BY THE APPEARANCE OF SPECIAL SYMBOLS IN A SYMBOL MATRIX," Ser. No. 10/371,016 "GAMING DEVICE HAVING SEPARATELY AND SIMULTANEOUSLY DISPLAYED PAYLINES,", Ser. No. 10/777,011 "GAMING DEVICE HAVING RESULTANT WILD SYMBOLS," Ser. No. 10/191,154 and "GAMING DEVICE HAVING EXTENDER SYMBOLS," Ser. No. 10/191,197.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Gaming device manufacturers strive to make gaming devices that provide as much enjoyment and excitement as possible. Providing a game in which a player has an opportunity to win multiple awards and potentially large awards or credits are ways to enhance player enjoyment and excitement. Currently, gaming machines or devices provide games, such as slot games, wherein a player has one or more opportunities to obtain a winning symbol combination on mechanical or video reels. In these gaming devices, the player initiates the spin of the reels by making a wager and the positions of the reels after they stop, determines whether a player wins a value and, if so, how much value the player wins. These gaming machines typically have certain features designated for outcomes such as when a player wins a value, when the player advances to a bonus round or when the game terminates. For example, these gaming machines often display the amount of credits earned, flash lights, make sounds or have other features designed to draw attention to the outcome and entertain the player.

One existing gaming device includes a plurality of reels and at least one bonus reel. The bonus reel includes a plurality of modifier symbols on it. In this gaming device, the plurality of reels spin and if a predetermined event occurs, the bonus reel is activated. The modifier symbol generated on the bonus reel is applied to the result from the plurality of reels and an award is provided to the player.

Another existing gaming device includes one or more wild symbols. Wild symbols provide a player with an additional opportunity to obtain winning combinations. In these existing gaming devices, a wild symbol functions to substitute for a plurality of the other generated symbols to result in a winning combination of symbols and an award for the player. For example, in a three reel slot machine, the symbols along a payline on the first, second and third reels may be, respectively, a heart, a heart and a wild symbol. If, in the gaming scheme, the gaming device awards a player for a three heart combination, the wild symbol substitutes for a heart and provides the player with that winning combination.

To increase player enjoyment and excitement, it is desirable to provide players with new features for gaming devices which use reels, where the new features involve one or more selectively activated supplemental reels.

SUMMARY OF THE INVENTION

The present invention relates in general to a gaming device, and more particularly to a gaming device having at least one activated extra or supplemental reel adapted to be activated when a designated symbol is generated on the reels.

The gaming device includes a plurality of primary symbol generators with a plurality of symbols on each symbol generator. In one embodiment, the symbol generators are primary reels with a plurality of symbols on each of the primary reels. At least one and preferably a plurality of the symbols on the primary reels are designated as activator symbols. An activator symbol is a symbol that, when generated on a primary reel, is adapted to cause the activation of at least one supplemental symbol generator, such as a supplemental reel. The supplemental reel includes a plurality of supplemental symbols. The activation of the supplemental symbol generator or supplemental reel can also be triggered by a combination of activator symbols on the primary symbol generators or primary reels.

In one embodiment, the primary reels spin to generate a plurality of symbols. The gaming device determines if an activator symbol was generated on the primary reels. If no activator symbol was generated on the primary reels, any award based on one of or a combination of the generated symbols is determined and provided to the player. If an activator symbol was generated on the primary reels, the supplemental reel is activated and displayed to the player. In one embodiment, even if the supplemental reel is activated, the gaming device determines if an award is associated with one of or a combination of the symbols generated by the primary reels and provides any determined award to the player.

In one embodiment, the activated supplemental reel is displayed adjacent to the primary reel with the generated activator symbol. That is, the supplemental reel is dynamic and adapted to be displayed at a plurality of different positions based on which of the plurality of primary reels generates the activator symbol. By positioning the supplemental reel adjacent to the primary reel which generated the activator symbol, the primary reel is displayed as splitting into the activated supplemental reel and the primary reel.

Once activated, the supplemental reel spins to generate a plurality of supplemental symbols. In one embodiment, the gaming device determines if an award is associated with one of or a combination of the symbols generated from the primary reels and the supplemental symbols generated from the supplemental reel and provides any determined award to the player. In another embodiment, the gaming device determines if an award is associated with one of or a combination of the plurality of symbols generated from a plurality of the primary reels (i.e., each of the primary reels except the primary reel which previously generated the activator symbol) and the supplemental symbols generated from the supplemental reel and provides any determined award to the player.

In one embodiment, after a supplemental reel is activated, the supplemental reel remains active for at least one or a plurality of subsequent activations or spins of the reels or symbol generators. In another embodiment, once activated, the supplemental reel remains active for a period of time. In one embodiment, if a supplemental reel is activated during a subsequent spin and another activator symbol is generated, then an additional supplemental reel is activated for at least one or a plurality of subsequent spins. In other words, more than one supplemental reels are adapted to be active and operational at the same time. In another embodiment, if a supplemental reel is active on a subsequent spin, an activator symbol can be generated on any of the primary reels but not on the supplemental reel. In another embodiment, if a supplemental reel is active on a subsequent spin, an activator symbol can be generated on any of the primary reels except the primary reel which previously generated an activator symbol. In another embodiment, if a supplemental reel is active on a subsequent spin, an activator symbol cannot be generated on any of the primary reels or the supplemental reel.

In one embodiment, each of the supplemental symbols on the supplemental reel are identical to the symbols of the primary reel which generated the activator symbol. In this embodiment, when an activator symbol is generated on a primary reel, the supplemental reel functions to mimic the results of the primary reel with the generated activator symbol. In other words, the supplemental symbols on the activated supplemental reel are identical to and in the same configuration as the symbol set of the primary reel which generated the activator symbol. For example, if a slot game has five primary reels and an activator symbol is generated on the third primary reel, then a supplemental reel with supplemental symbols which are identical to the third primary reel (i.e., the same symbols in the same symbol configuration) is activated and displayed adjacent to the third primary reel. In this embodiment, for each subsequent spin, the activated supplemental reel will generate the same symbols in the same order or configuration as the third primary reel. In other words, for each subsequent spin, the player is assured of obtaining at least two adjacent identical symbols (i.e., the symbol generated on the third primary reel and the identical supplemental symbol generated on the adjacent supplemental reel). In another embodiment, each of the supplemental symbols on the supplemental reel are identical to the symbols of the primary reel which generated the activator symbol, but for each subsequent spin, the activated supplemental reel will generate symbols independent of the primary reel which generated the activator symbol.

In another embodiment, the supplemental symbols of the supplemental reel are independent of any of the symbol sets of any of the plurality of primary reels. In this embodiment, the activated supplemental reel functions as an extra reel independent of each of the other primary reels. That is, the supplemental reel has a different symbol set in a different symbol configuration than any of the primary reels. In one embodiment, when the independent supplemental reel is activated, the gaming device utilizes a different paytable than when the supplemental reel is not activated. That is, since the activated supplemental reel functions as an additional reel which generates a plurality of symbols and the awards are based on one or a combination of the generated symbols, the gaming device utilizes a different paytable to account for the additional reel. In other words, if a jackpot award is associated with the reels generating all “cherry” symbols and since the odds of obtaining six “cherry” symbols on a six reel game (i.e., the five primary reels and the one supplemental reel) are less than the odds of obtaining five “cherry” symbols on a five reel game (i.e., the five primary reels), in this embodiment, the gaming device utilizes a modified paytable with a greater jackpot award when the supplemental reel is active than when the supplemental reel is not active.

In another embodiment, at least one of the supplemental symbols on the activated supplemental reel is a wild symbol. In another embodiment, a plurality of the supplemental symbols on the activated supplemental reel are wild symbols. In another embodiment, each of the supplemental symbols on the activated supplemental reel are wild symbols. In these embodiments, each supplemental wild symbol is adapted to substitute for one of a plurality of the symbols generated on the primary reels to form a symbol combination associated with an award. That is, a wild symbol can enable the matching of symbols along a payline to achieve a winning combination. For example, when activated, the supplemental wild symbols may substitute for any of the other symbols to form a different symbol combination than initially generated. In another embodiment, at least one of the supplemental symbols on the activated supplemental reel is a secondary game triggering symbol, such as a free game triggering symbol.

The gaming device of the present invention increases player enjoyment by providing a supplemental reel which is activated by at least one symbols that is generated on the primary reels. That is, by providing players with new reel features wherein the new features involve a separately activated extra reel, the gaming device of the present invention provides the player with a more exciting gaming experience.

Additional features and advantages of the present invention are described in, and will be apparent from, the following Detailed Description of the Invention and the figures.

DETAILED DESCRIPTION OF THE INVENTION

Figure 1A:
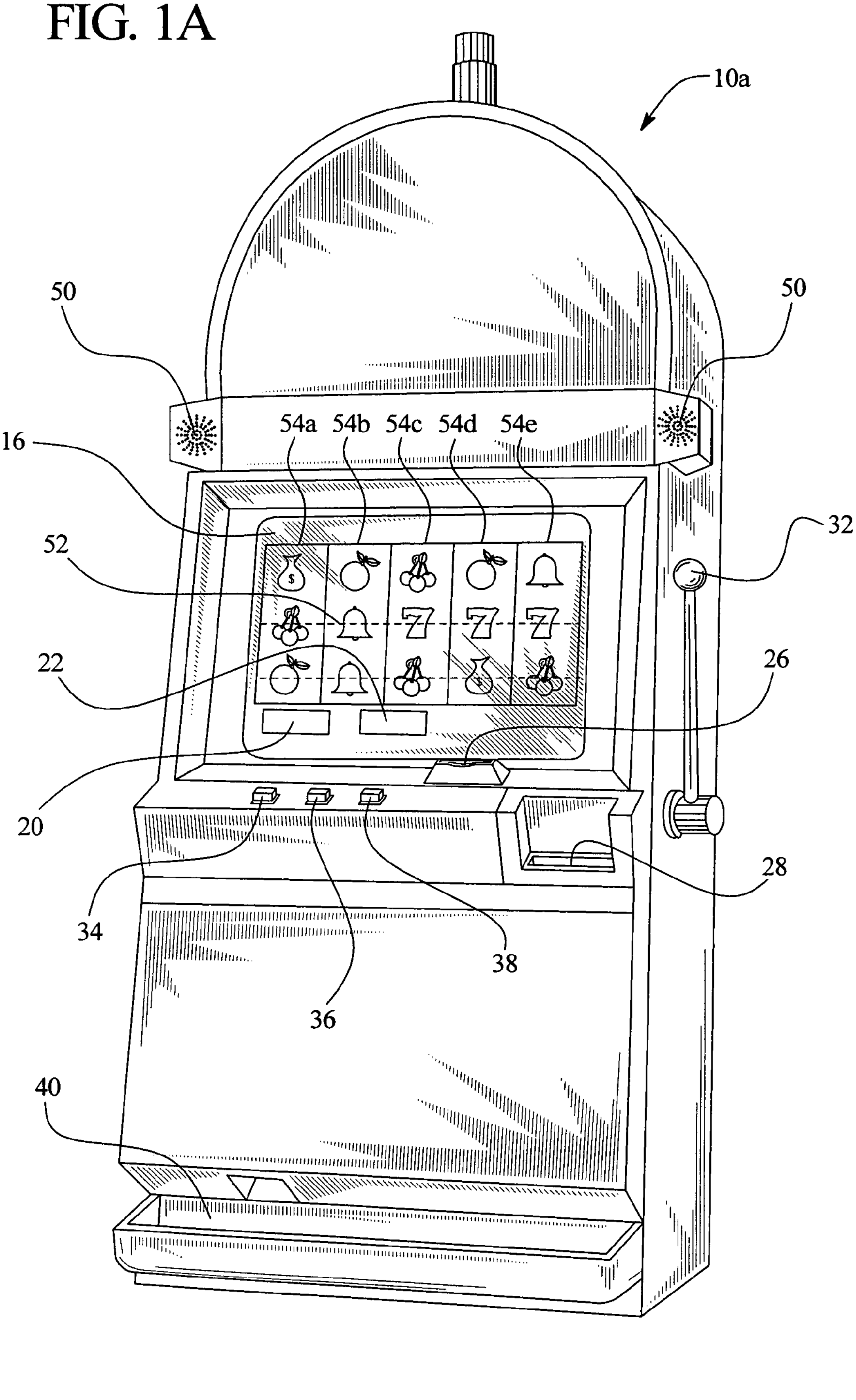
FIG. 1A is a front-side perspective view of one embodiment of the gaming device of the present invention.
Figure 1B:
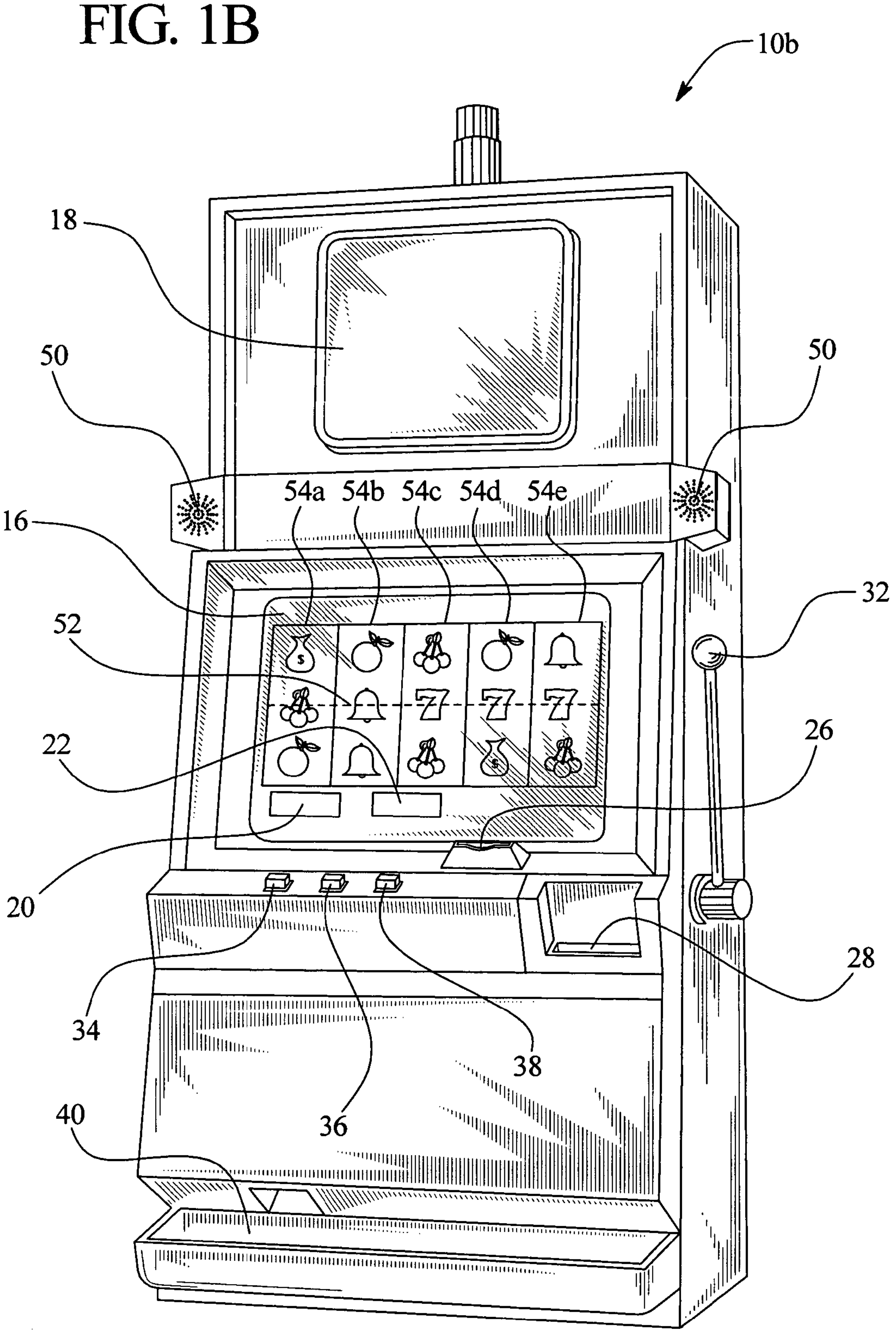
FIG. 1B is a front-side perspective view of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
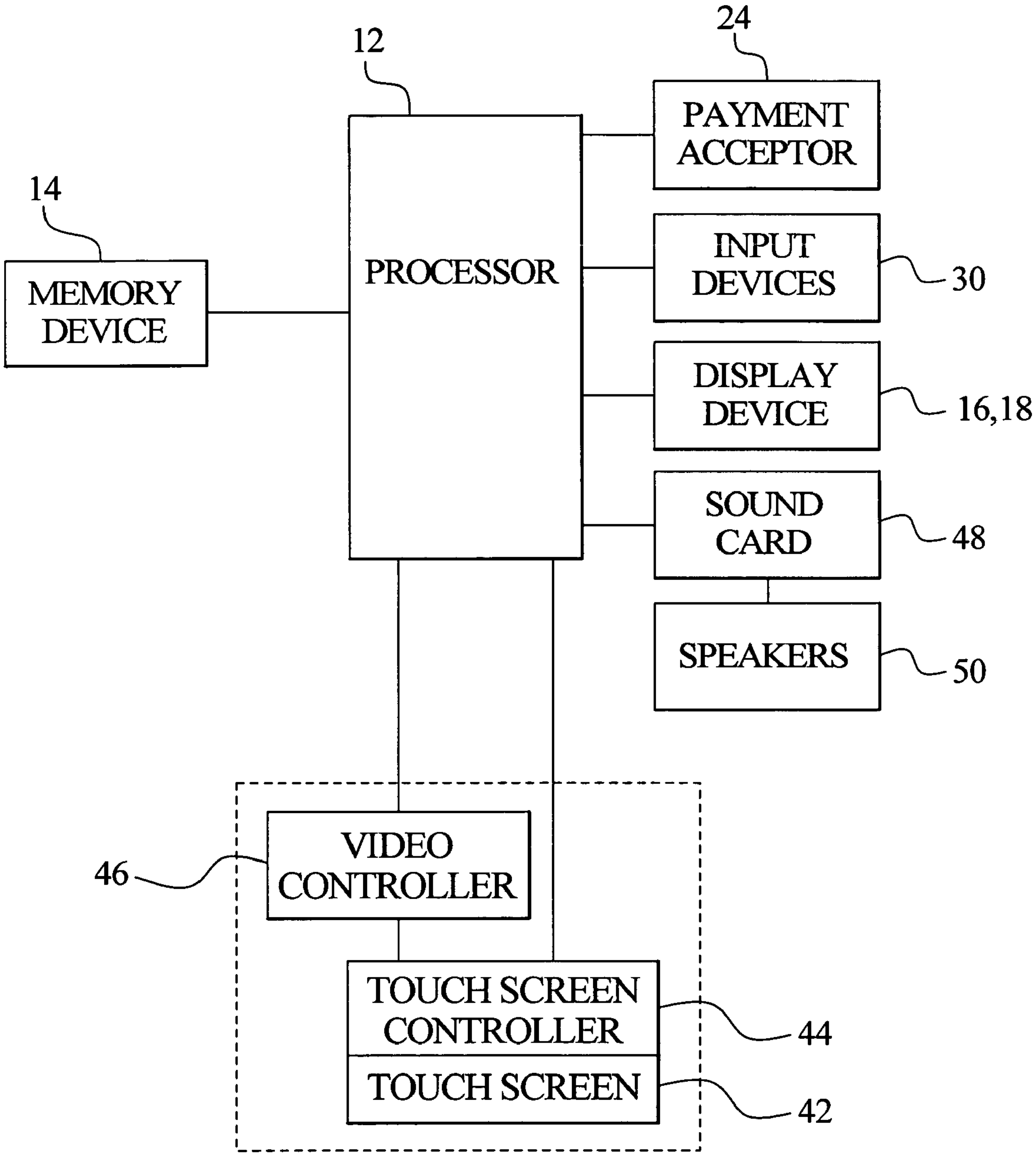
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera, in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Figure 2B:
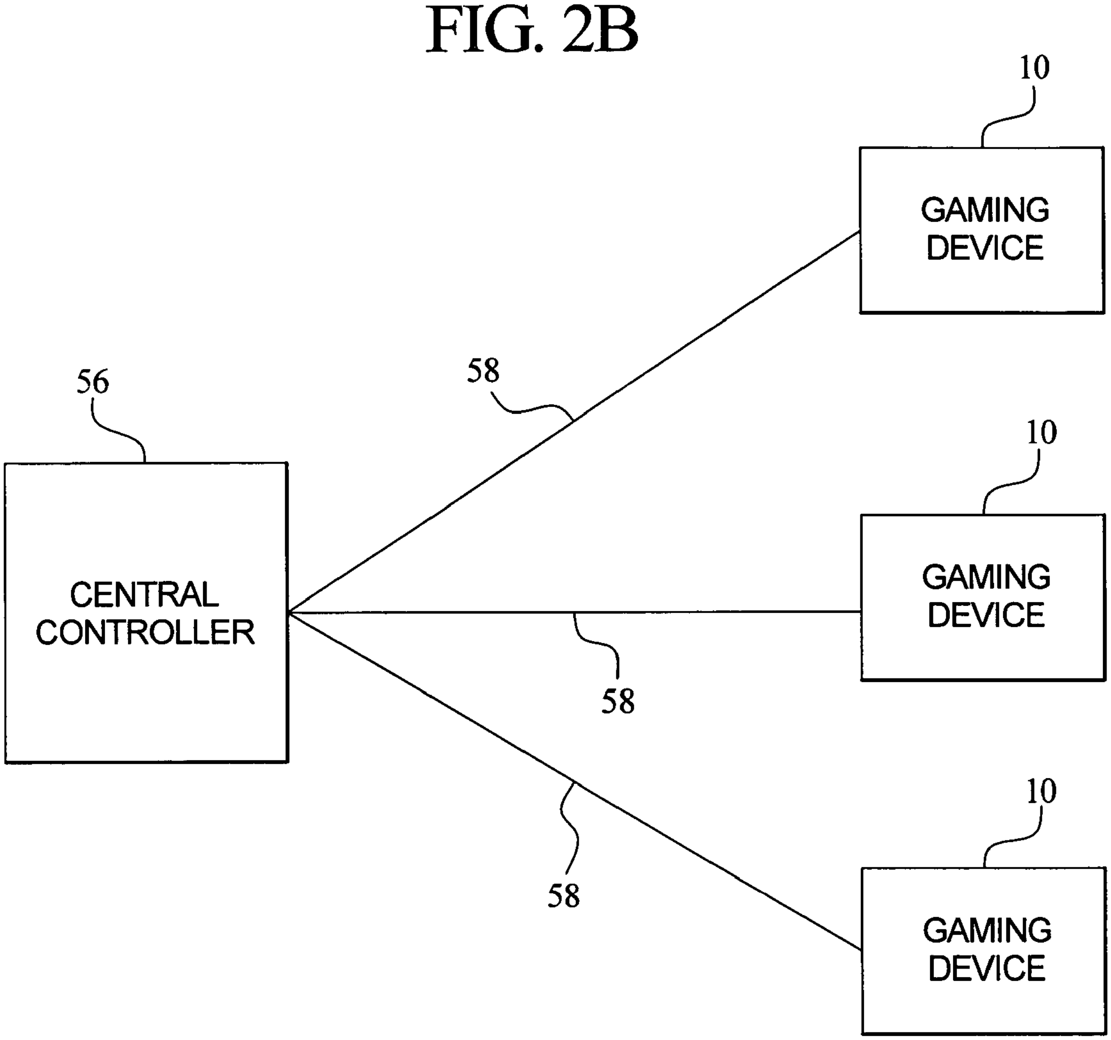
FIG. 2B is a schematic block diagram illustrating a plurality of gaming terminals in communication with a central controller.

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an Internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

The reel or slot game of the present invention can be provided to the player as a primary or base game or as a secondary or bonus game. If the reel or slot game is provided as a secondary game, then the gaming device can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented into the present invention.

In one embodiment, a base or primary game may be a poker game wherein the gaming device enables the player to play a conventional game of video poker and initially deals five cards all face up from a virtual deck of fifty-two cards. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and replacement cards are dealt from the remaining cards in the deck. This results in a final five-card hand. The final five-card hand is compared to a payout table which utilizes conventional poker hand rankings to determine the winning hands. The player is provided with an award based on a winning hand and the credits the player wagered.

In another embodiment, the base or primary game may be a multi-hand version of video poker. In this embodiment, the player is dealt at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

If the reel game of the present invention is incorporated as a primary or base game, then in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; he must win or earn entry through play of the primary game and, thus, play of the primary game is encouraged. In another embodiment, qualification of the bonus or secondary game could be accomplished through a simple "buy in" by the player if, for example, the player has been unsuccessful at qualifying through other specified activities.

Regardless of if the reel or slot game of the present invention is incorporated as a primary or base game or as a secondary or bonus game, the reel or slot game includes one or more paylines 52 as illustrated in FIGS. 1A and 1B. The paylines may be horizontal, vertical, circular, diagonal, angled or any combination thereof. In one embodiment, the gaming device displays at least one and preferably a plurality of primary reels 54. As illustrated in FIGS. 1A and 1B, the gaming device includes five primary reels 54*a*, 54*b*, 54*c*, 54*d* and 54*e*. The primary reels are in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In one embodiment, if the reels 54 are in video form, the plurality of simulated video reels 54 are displayed on one or more of the display devices as described above. Each primary reel 54 displays a plurality of indicia or symbols 104 such as bells, hearts, fruits, numbers, letters, bars or other images which preferably correspond to a theme associated with the gaming device.

Selectively Activated Supplemental Reel

Figure 3A:
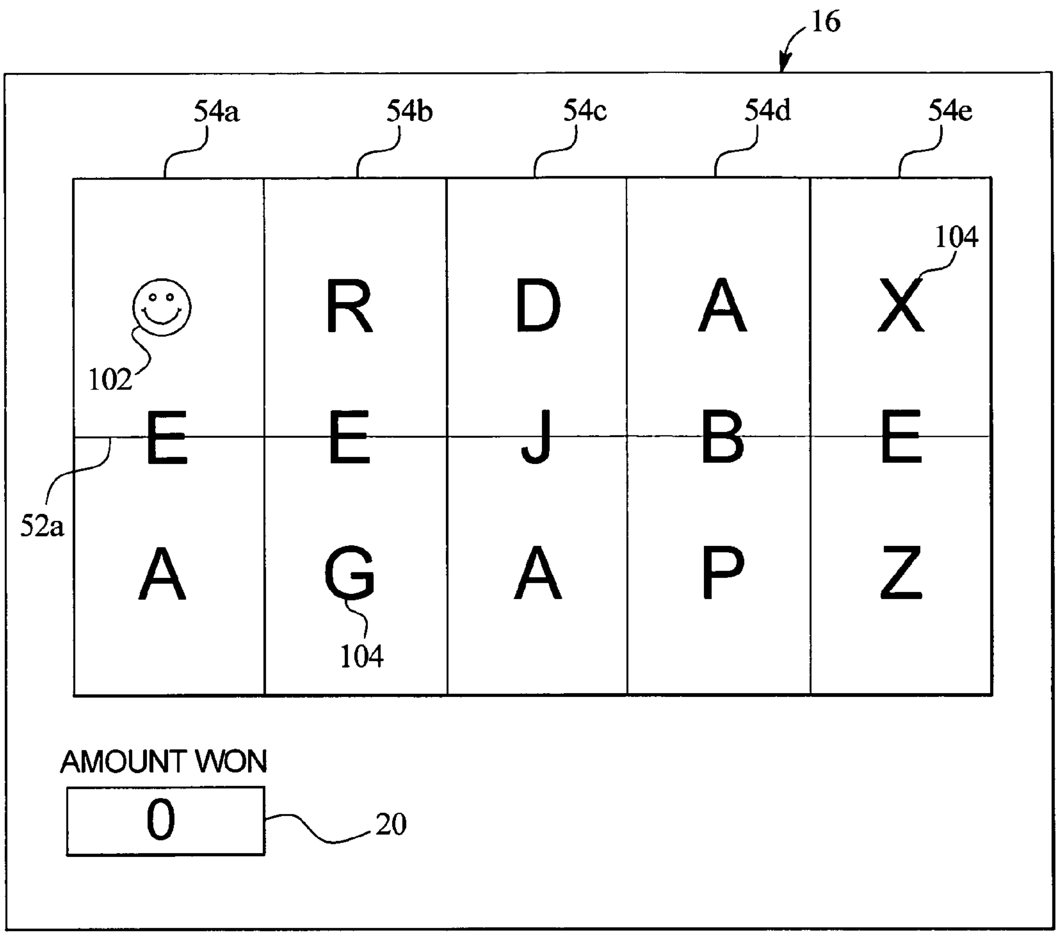
FIGS. 3A, 3B and 3C are front elevational views of one embodiment of the present invention illustrating the activation of a supplemental reel with a plurality of supplemental symbols.

Referring now to FIG. 3A, a plurality of symbols 104 are generated on the plurality of primary reels. One of the generated symbols on the first primary reel 54*a* is designated as an activator symbol 102 illustrated as the "☺". In one embodiment, an activator symbol is a symbol that, when generated on a primary reel, is adapted to cause the activation of at least one supplemental reel. In another embodiment, an activator symbol is a symbol that, when generated on a primary reel, is adapted to cause the activation of a plurality of supplemental reels.

In one embodiment, the gaming device includes at least one symbol designated as an activator symbol. In another embodiment, the gaming device includes a plurality of symbols designated as activator symbols. In one embodiment, a plurality of the primary reels each include at least one symbol designated as an activator symbol. In another embodiment, a plurality of the primary reels each include a plurality of symbols designated as activator symbols. In another embodiment, each of the primary reels includes at least one symbol designated as an activator symbol. In another embodiment, each of the primary reels includes a plurality of symbols designated as activator symbols.

In one embodiment, the number of symbols designated as activator symbols on the primary reels is based on the player's wager (or a component of the wager), a triggering event or other predetermined or randomly determined occurrence. In another embodiment, the location of each symbol designated as an activator symbol on the primary reels is based on the player's wager (or a component of the wager), a triggering event or other predetermined or randomly determined occurrence.

As illustrated in FIG. 3A, upon a suitable triggering event, such as a wager, the primary reels (and not any supplemental reels) are activated to generate a plurality of symbols. The gaming device determines any suitable award associated with any symbol or symbol combination generated on an active payline 52*a* of the primary reels. Any determined award is provided to the player. As displayed in the credit display 20, an award is not provided to the player based on these initially generated symbols.

After providing the player any award initially generated by the primary reels, the gaming device determines whether a designated activator symbol is generated on any of the plurality of primary reels. If no activator symbol is generated, the reel game ends. In one embodiment as described below, if an activator symbol is generated, the gaming device proceeds to activate the supplemental reel. In another embodiment, the gaming device activates the supplemental reel if a plurality of activator symbols are generated.

Figure 3B:
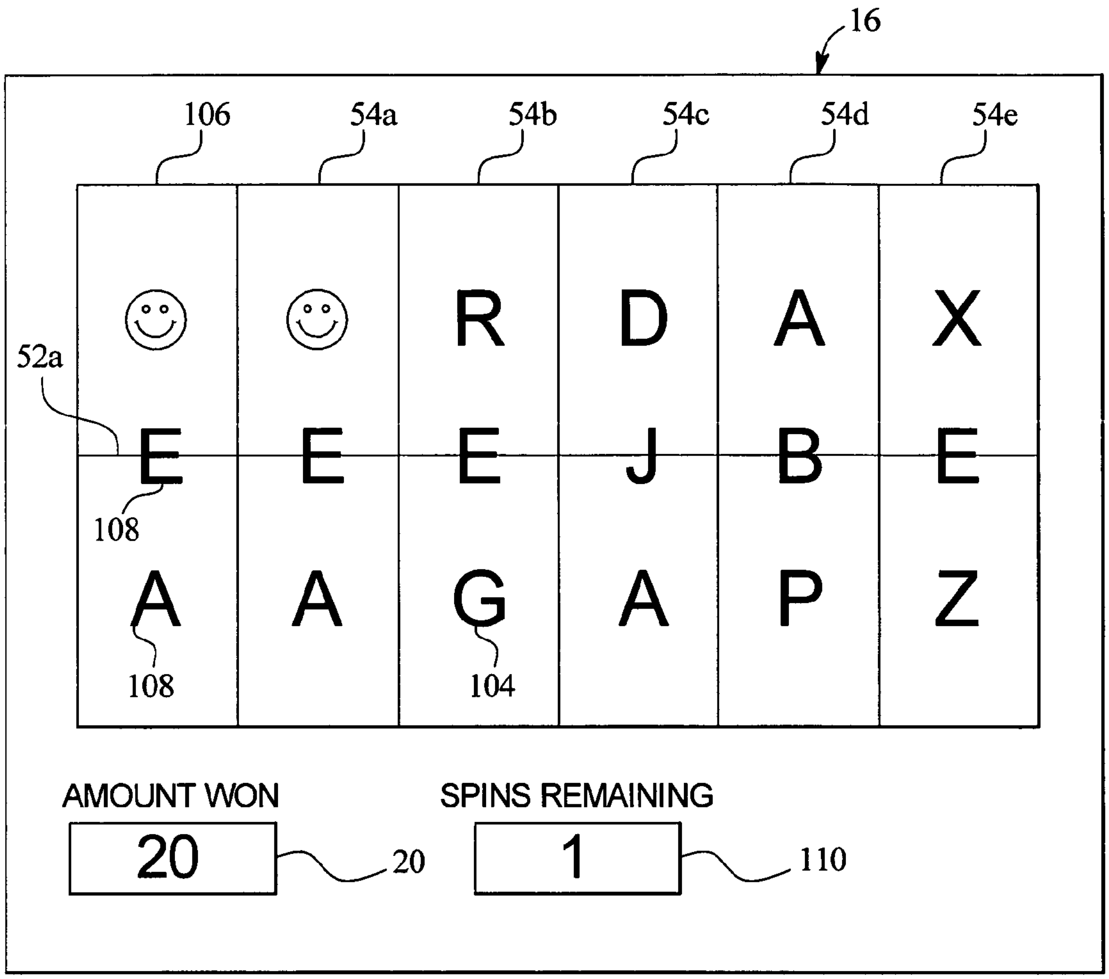

Since the designated activator symbol is generated on one of the primary reels as illustrated in FIG. 3A, a supplemental reel 106 with a plurality of supplemental symbols 108 is activated and displayed to the player as illustrated in FIG. 3B. In this embodiment, the supplemental reel is displayed adjacent to the primary reel with the generated activator symbol. In other embodiments, the supplemental reel is displayed at a location based on the player's wager (or a component of the wager), a triggering event or other predetermined or randomly determined occurrence. In another embodiment, the supplemental reel is displayed at a predetermined or randomly determined location.

As seen in FIG. 3B, the supplemental reel has the identical symbol set as the primary reel with the generated activator symbol, in this case the first primary reel 54*a*. That is, the supplemental symbols on the supplemental reel are the same symbols in the same configuration as the symbol set of the primary reel which generated the activator symbol. In another embodiment, the supplemental reel has the identical symbol set as one of the primary reels that did not generate the activator symbol. In another embodiment, the supplemental reel has the identical symbol set as a predetermined or randomly determined primary reel. In other embodiments, the primary reel which the supplemental reel has the identical symbol set as is based on the player's wager (or a component of the wager), a triggering event or other predetermined or randomly determined occurrence.

As illustrated in FIG. 3B, in this embodiment, the active payline 52*a* extends through the supplemental reel and any award based on the modified symbol combination of the initially generated symbols and the generated supplemental symbols is determined and provided to the player. In this case, as displayed in the credit display 20, an award of twenty is provided to the player based on this modified combination of symbols. It should be appreciated that the initial symbol combination of two "E" symbols on the active payline 52*a* of the first primary reel 54*a* and the second primary reel 54*b* did not result in a symbol combination associated with an award, but the modified symbol combination of two "E" symbols on the first primary reel 54*a* and second primary reel 54*b* with the supplemental "E" symbol on the activated supplemental reel 106 was associated with an award of twenty.

In one embodiment, the supplemental reel remains active for at least one or a plurality of subsequent spins of the reels. As seen in FIG. 3B, the gaming device displays a spins remaining display 110 which indicates to the player the number of subsequent spins in which the supplemental reel will remain active. In one embodiment, the number of subsequent spins in which the supplemental reel remains active is based on the player's wager (or a component of the wager), a triggering event or other predetermined or randomly determined occurrence. In another embodiment, the supplemental reel remains active for a period of time. In this embodiment, the period of time in which the supplemental reel remains active is based on the player's wager (or a component of the wager), a triggering event or other predetermined or randomly determined occurrence. In one embodiment, the supplemental reel remains active for at least one or a plurality of free spins. In another embodiment, the player must place a separate wager for each of the subsequent spins that the supplemental reel remains active. In another embodiment, the supplemental reel does not remain active for any subsequent reel spins. In this embodiment, after any award is determined based on the modified symbol combination, the supplemental reel is deactivated.

Figure 3C:
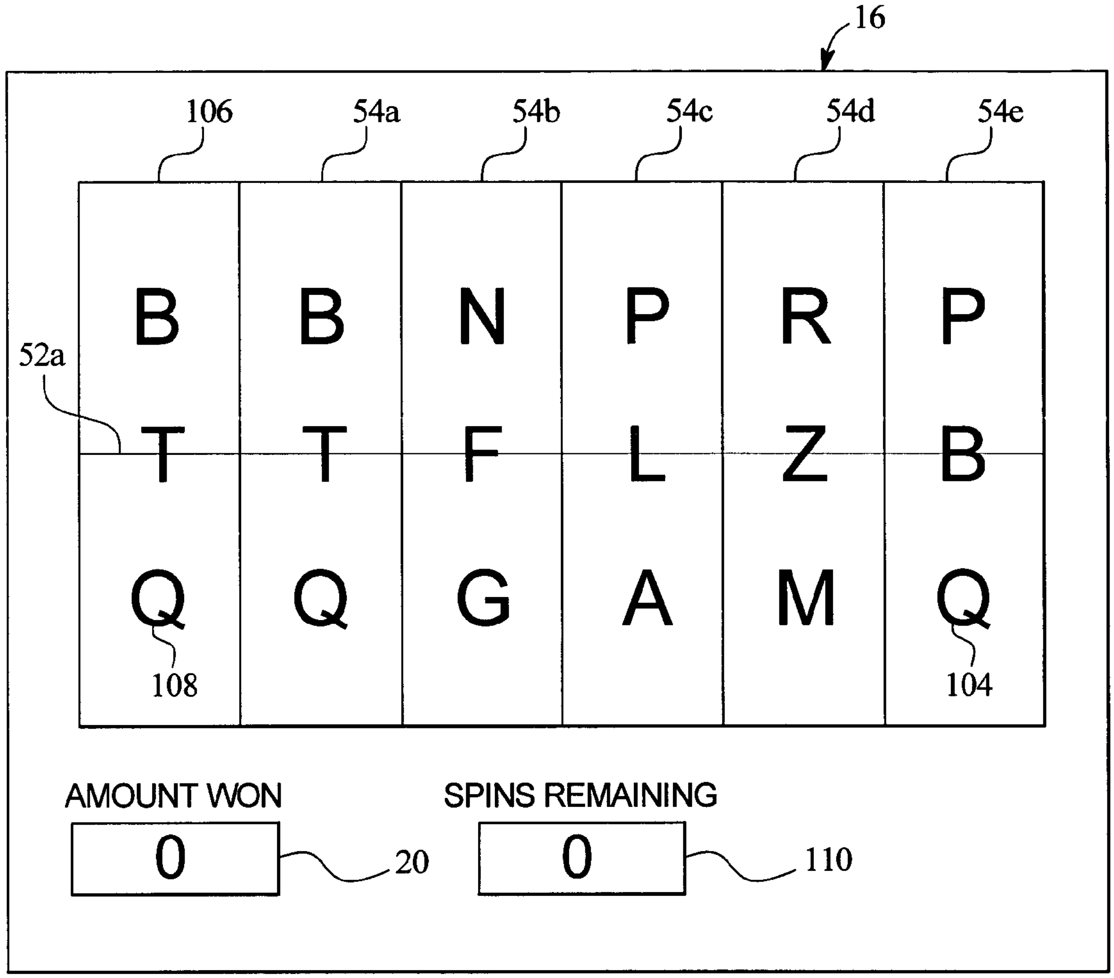

As illustrated in FIG. 3C, since the player has at least one subsequent spin in which the supplemental reel remains active, the player may spin the reels again and the plurality of primary reels and the active supplemental reel generate a plurality of symbols. The number of subsequent spins in which the supplemental reel remains active is reduced by one 110 and any award associated with the generated symbol combination is determined and provided to the player. As displayed in the credit display 20, an award is not provided to the player based on this generated symbol combination. It should be appreciated that because the supplemental reel and the primary reel which previously generated the activator symbol have the same set of symbols in the same configuration, in this embodiment, at least two adjacent identical symbols will be generated for each subsequent spin of the reels in which the supplemental reel remains active. In other words, since the player's award may be based on the number of identical symbols generated adjacent to each other and each subsequent spin guarantees that at least two identical symbols will be generated adjacent to each other, the player has a greater probability of obtaining a winning symbol combination in each subsequent spin in which the supplemental reel remains active.

In one embodiment, if a supplemental reel is active on a subsequent spin, an activator symbol can be generated on any of the plurality of reels, including the supplemental reel. In this embodiment, if an activator symbol is generated on one of the reels, then another supplemental reel with a plurality of supplemental symbols will be activated and more than one supplemental reel may be active for at least one subsequent spin. That is, if a first supplemental reel is activated for five subsequent spins and on the third subsequent spin, an activator symbol is generated on one of the reels then a second supplemental reel is activated for four subsequent spins. In this example, both the first supplemental reel and the second supplemental reel will be active for the next two subsequent spins. In another embodiment, if a supplemental reel is active on a subsequent spin, an activator symbol can be generated on any of the primary reels but not on the supplemental reel. In another embodiment, if a supplemental reel is active on a subsequent spin, an activator symbol can be generated on any of the primary reels except, in one embodiment, the primary reel which previously generated an activator symbol. In another embodiment, if a supplemental reel is active on a subsequent spin, an activator symbol cannot be generated on any of the primary reels or the supplemental reel.

Figure 4A:
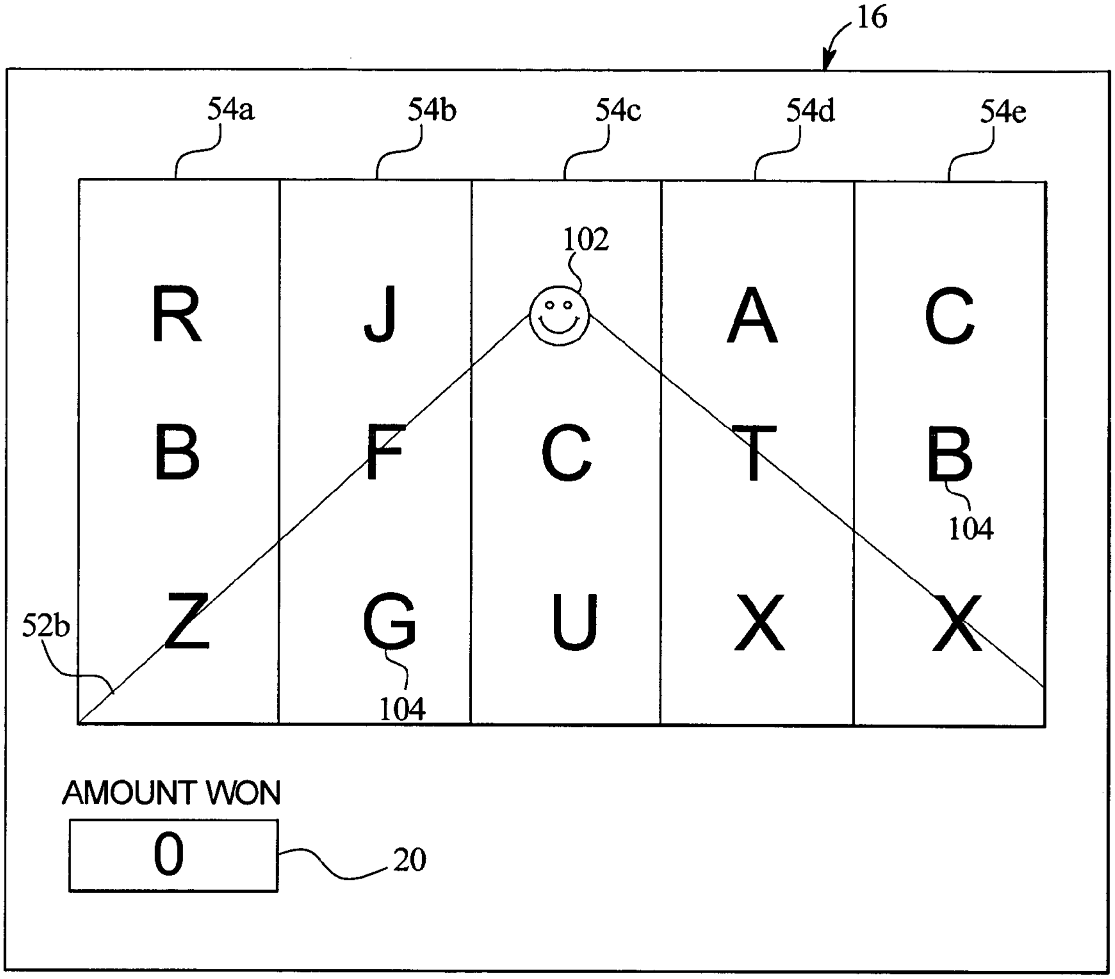
FIGS. 4A, 4B and 4C are front elevational views of one embodiment of the present invention illustrating the activation of a supplemental reel with a plurality of supplemental symbols wherein the award provided to the player is based on different combinations of the generated symbols.

Referring now to FIG. 4A, in another embodiment, the supplemental symbols of the supplemental reel are independent of any of the symbol sets of any of the plurality of primary reels. In this embodiment, the plurality of primary reels (and not any supplemental reels) are activated to spin and the gaming device provides the player any award associated with any generated symbol combination which was generated on the active payline 52*b*. In this case, no award was associated with the initial symbols generated on the active payline and thus no award is indicated to the player in the credit display 20. The gaming device also determines whether a designated activator symbol is generated on any of the plurality of primary reels. As seen in FIG. 4A, an activator symbol 102 is generated on the third primary reel, 54*c*.

Figure 4B:
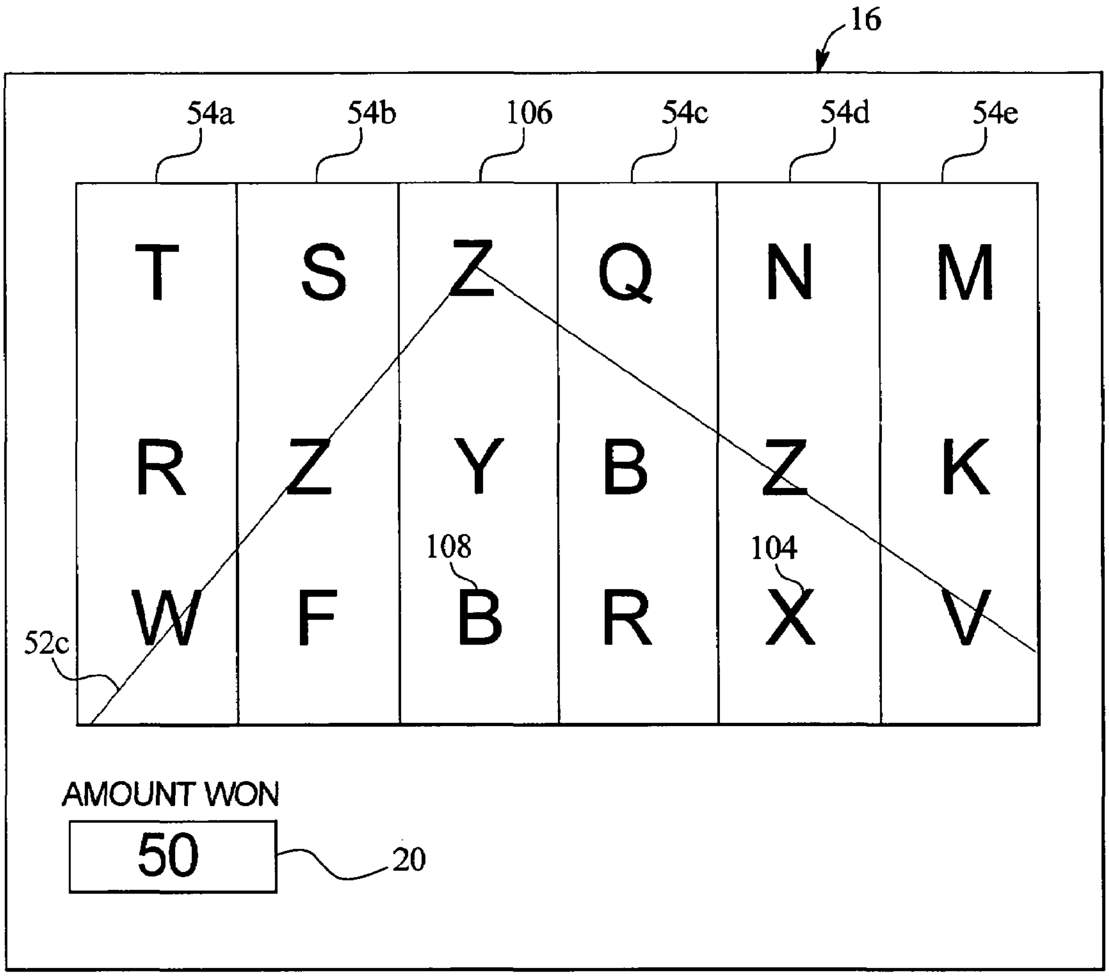

Since the activator symbol 102 is generated on one of the primary reels, as illustrated in FIG. 4A, a supplemental reel 106 is activated, as illustrated in FIG. 4B. In this embodiment, the activated supplemental reel includes a plurality of supplemental symbols 108 that are different than and independent of each of the symbol sets on the other primary reels. In this embodiment, when the supplemental reel is activated, each of the plurality of reels generates a plurality of symbols. That is, not only does the supplemental reel generate a plurality of supplemental symbols, but the primary reels generate another plurality of symbols. In another embodiment, when activated, only the supplemental reel generates a plurality of supplemental symbols and the gaming device determines whether any award is associated with the combination of initially generated symbols from the primary reel and the supplemental symbols from the supplemental reel.

In addition to generating another plurality of symbols on the primary reels when the supplemental reel is activated, FIG. 4B illustrates that in one embodiment, the gaming device determines if an award is provided to the player based on the symbols generated on less than each of the reels. In this embodiment, after the plurality of reels generate another plurality of symbols, the active payline 52*c* extends through the supplemental reel and each of the primary reels except the primary reel which generated the activator symbol, in this case 54*c*. In other words, the active payline extends through supplemental reel 106 and primary reels, 54*a*, 54*b*, 54*d* and 54*e*. As seen in FIG. 4B, the gaming device determines that the symbol combination of two "Z" symbols on the second primary reel 54*b* and fourth primary reel 54*d* with the supplemental "Z" symbol on the activated supplemental reel 106 is associated with an award of fifty which is provided to the player.

Figure 4C:
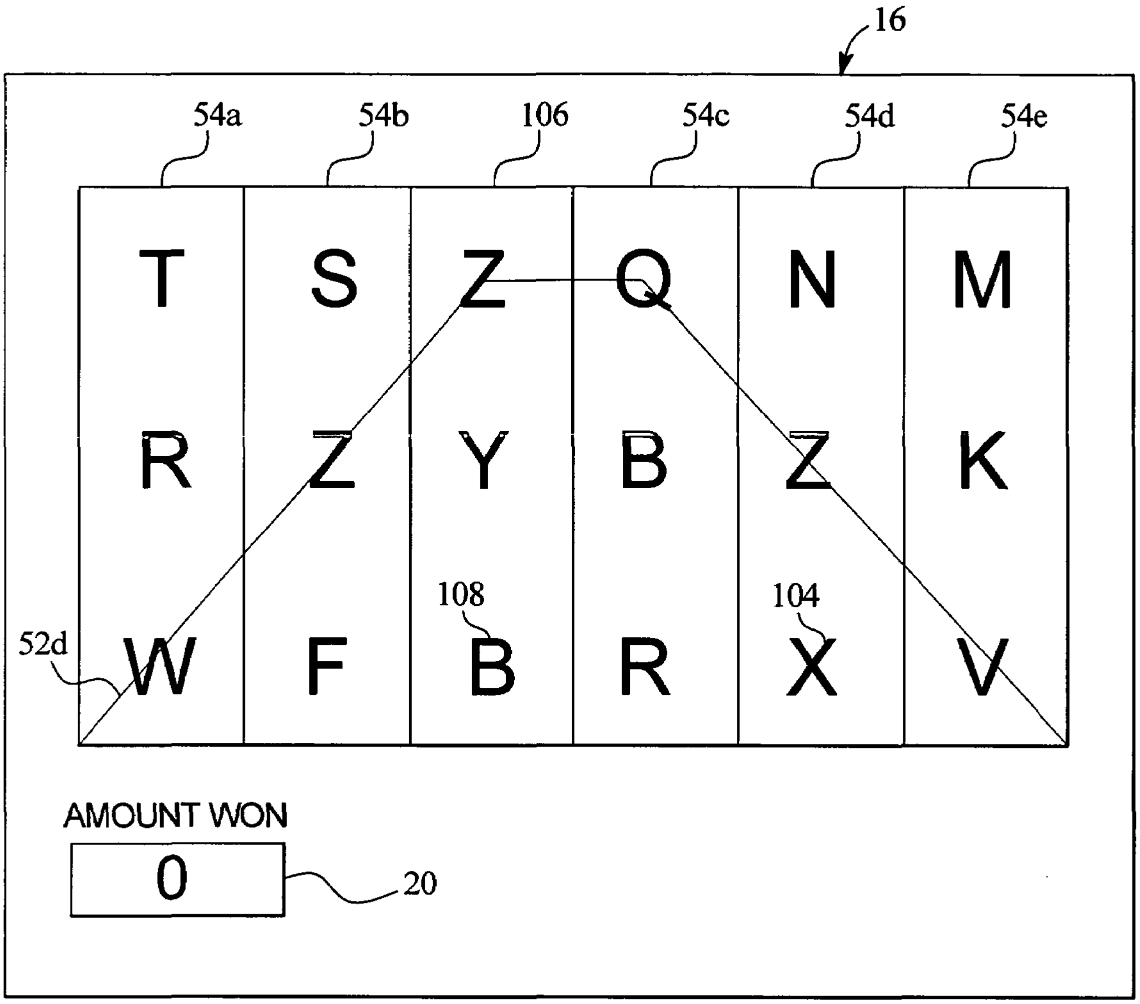

In another embodiment, as indicated in FIG. 4C, the active payline 52*d* extends through the supplemental reel and each of the plurality of primary reels. That is, the gaming device determines if an award is provided to the player based on the symbols generated on each of the primary reels and the supplemental reel. As seen in FIG. 4C, in this embodiment the active payline extends through primary reels 54*a* and 54*b*, supplemental reel 106 and primary reels 54*c*, 54*d* and 54*e*. In this embodiment, the symbol combination associated with the symbols generated on the active payline 52*d* is not associated with an award in the applicable paytable. It should be appreciated that while the generated symbols are the same in FIGS. 4B and 4C, the award provided to the player changed based on the active payline used for each embodiment.

In another embodiment, the gaming device is adapted to determine if an award is provided to the player based on the symbols generated on each of the primary reels and the supplemental reel as well as determine if an award is provided to the player based on the symbols generated on less than each of the reels and provide the player the higher determined award. That is, the gaming device of the present invention is adapted to perform a dual evaluation of the generated plurality of symbols.

In another embodiment, at least one of the supplemental symbols on the activated supplemental reel is a wild symbol. In another embodiment, the supplemental reel includes a plurality of supplemental symbols wherein a plurality of said supplemental symbols are wild symbols. In another embodiment, the activated supplemental reel includes a plurality of supplemental wild symbols. In one embodiment, the number of supplemental wild symbols is based on the player's wager (or a component of the wager), a triggering event or other predetermined or randomly determined occurrence. Each supplemental wild symbol is adapted to substitute for one of the plurality of symbols generated on the primary reels. That is, a wild symbol can enable the matching of symbols along a payline to achieve a winning combination. For example, when activated, the supplemental wild symbols may substitute for any of the other symbols to form a different symbol combination than initially generated.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device comprising:

at least one display device;

at least one input device;

at least one processor; and at least one memory device which stores a plurality of instructions, which when executed by the at least one processor, cause the at least one processor to operate with the at least one display device and the at least one input device to control a play of a game by:

(a) enabling a player to participate in the play of game by placing a wager amount on at least one of a plurality of paylines;

(b) displaying a plurality of reels, wherein each of said plurality of displayed reels includes a plurality of symbols, said plurality of symbols including an activator symbol;

(c) generating and displaying a plurality of said symbols on said displayed reels, said symbols displayed along the plurality of paylines;

(d) determining whether said activator symbol is generated and displayed on one of said displayed reels;

(e) if said activator symbol is generated and displayed on one of said displayed reels:

(i) displaying a selectively activated supplemental reel and a plurality of supplemental symbols on said supplemental reel in addition to said displayed plurality of symbols on said displayed plurality of reels, wherein each of said displayed symbols on each of said plurality of reels and each of said displayed supplemental symbols on said supplemental reel are simultaneously displayed, and wherein the displayed supplemental symbols on said displayed supplemental reel are initially identical to the displayed symbols on said displayed reel with said generated and displayed activator symbol, (ii) for each wagered on payline, determining if any winning symbol combinations are displayed, wherein said determination includes evaluating each of said symbols generated along said wagered on payline on each of said displayed reels and each of said supplemental symbols displayed along said wagered on payline on said displayed supplemental reel, and wherein said determination occurs prior to generating any of said supplemental symbols on said displayed supplemental reel, (iii) thereafter, generating and displaying a plurality of the supplemental symbols on said displayed supplemental reel, said supplemental symbols generated along the plurality of paylines, (iv) for each wagered on payline, determining if any winning symbol combinations are displayed, wherein said determination includes evaluating each of said symbols generated along said wagered on payline on each of said displayed reels and each of said supplemental symbol additionally and subsequently generated along said wagered on payline on said supplemental reel, and (v) providing any awards associated with any displayed winning symbol combinations to the player, and (f) if said activator symbol is not generated and not displayed on one of said displayed reels:

(i) for each wagered on payline, determining if any winning symbol combinations are displayed, wherein said determination includes evaluating each of said symbols generated along said wagered on payline on said displayed reels, and (ii) providing any awards associated with any displayed winning symbol combinations to the player.

2. The gaming device of claim 1, wherein at least one of said supplemental symbols is a wild symbol.

3. The gaming device of claim 1, wherein a plurality of said supplemental symbols are wild symbols.

4. The gaming device of claim 1, wherein each of said supplemental symbols are wild symbols.

5. The gaming device of claim 1, wherein when executed by the at least one processor, said plurality of instructions cause the at least one processor to operate with the at least one display device to control the play of the game by displaying said supplemental reel adjacent to the displayed reel which generated and displayed the activator symbol.

6. The gaming device of claim 1, wherein when executed by the at least one processor, said plurality of instructions cause the at least one processor to control the play of the game by enabling the player to play at least one additional game if said activator symbol is generated and displayed on one of said displayed reels, wherein the supplemental reel remains displayed for each of said additional games.

7. The gaming device of claim 1, wherein when executed by the at least one processor, said plurality of instructions cause the at least one processor to control the play of the game by enabling the player to play the game for a period of time if said activator symbol is generated and displayed on one of said displayed reels, wherein the supplemental reel remains displayed for said period of time.

8. The gaming device of claim 1, wherein said plurality of symbols on said displayed reels include a plurality of activator symbols.

9. The gaming device of claim 1, which includes a plurality of supplemental reels, wherein each supplemental reel includes a plurality of supplemental symbols.

10. The gaming device of claim 1, wherein if the activator symbol is generated and displayed on one of said displayed reels, when executed by the at least one processor, said plurality of instructions cause the at least one processor to control the play of the game by determining for each wagered on payline, an outcome based on said symbols generated along said wagered on payline on said displayed reels, wherein said determination occurs prior to displaying said supplemental reel.

11. A gaming device comprising:

at least one display device;

at least one input device;

at least one processor; and at least one memory device which stores a plurality of instructions, which when executed by the at least one processor, cause the at least one processor to operate with the at least one display device and the at least one input device to control a play of a game by:

(a) enabling a player to participate in the play of the game by placing a wager amount on at least one of a plurality of paylines;

(b) displaying a plurality of reels, wherein each of said plurality of displayed reels includes a plurality of symbols, said plurality of symbols including an activator symbol;

(c) generating and displaying a plurality of said symbols on said displayed reels, said symbols displayed along the plurality of paylines;

(d) determining whether said activator symbol is generated and displayed on one of said displayed reels;

(e) if said activator symbol is generated and displayed on one of said displayed reels:

(i) for each wagered on payline, determining if any winning symbol combinations are displayed, wherein said determination includes evaluating each of said symbols generated along said wagered on payline on said displayed reels, and wherein said determination occurs prior to displaying a selectively activated supplemental reel, (ii) displaying said supplemental reel and a plurality of supplemental symbols on said supplemental reel in addition to said displayed plurality of symbols on said displayed plurality of reels, wherein each of said displayed symbols on each of said plurality of reels and each of said displayed supplemental symbols on said supplemental reel are simultaneously displayed, and wherein the displayed supplemental symbols on said displayed supplemental reel are initially different than the plurality of displayed symbols on said plurality of displayed reels, (iii) for each wagered on payline, determining if any winning symbol combinations are displayed, wherein said determination includes evaluating each of said symbols generated along said wagered on payline on each of said displayed reels and each of said supplemental symbols displayed along said wagered on payline on said displayed supplemental reel, and wherein said determination occurs prior to generating any of said supplemental symbols on said displayed supplemental reel, (iv) thereafter, generating and displaying a plurality of the supplemental symbols on said displayed supplemental reel, said supplemental symbols generated along the plurality of paylines, (v) for each wagered on payline, determining if any winning symbol combinations are displayed, wherein said determination includes evaluating each of said symbols generated along said wagered on payline on each of said displayed reels and each of said supplemental symbols additionally and subsequently generated along said wagered on payline on said supplemental reel, and (vi) providing any awards associated with any displayed winning symbol combinations to the player, and (f) if said activator symbol is not generated and not displayed on one of said displayed reels:

(i) for each wagered on payline, determining if any winning symbol combinations are displayed, wherein said determination includes evaluating each of said symbols generated along said wagered on payline on said displayed reels, and (ii) providing any awards associated with any displayed winning symbol combinations to the player.

12. The gaming device of claim 11, wherein at least one of said supplemental symbols is a wild symbol.

13. The gaming device of claim 11, wherein a plurality of said supplemental symbols are wild symbols.

14. The gaming device of claim 11, wherein each of said supplemental symbols are wild symbols.

15. The gaming device of claim 11, wherein when executed by the at least one processor, said plurality of instructions cause the at least one processor to operate with the at least one display device to control the play of the game by displaying said supplemental reel adjacent to the displayed reel which generated and displayed the activator symbol.

16. The gaming device of claim 11, wherein when executed by the at least one processor, said plurality of instructions cause the at least one processor to control the play of the game by enabling the player to play at least one additional game if said activator symbol is generated and displayed on one of said displayed reels, wherein the supplemental reel remains activated for each of said additional games.

17. The gaming device of claim 11, wherein when executed by the at least one processor, said plurality of instructions cause the at least one processor to control the play of the game by enabling the player to play the game for a period of time if said activator symbol is generated and displayed on one of said displayed reels, wherein the supplemental reel remains displayed for said period of time.

18. The gaming device of claim 11, wherein said plurality of symbols includes a plurality of activator symbols.

19. The gaming device of claim 11, which includes a plurality of supplemental reels, wherein each supplemental reel includes a plurality of supplemental symbols.

20. A method of operating a gaming device, said method comprising:

(a) enabling a player to place a wager amount on at least one of a plurality of paylines;

(b) causing a display device to display a plurality of generated symbols on a plurality of displayed reels, wherein said symbols includes at least one activator symbol and said symbols are displayed along the plurality of paylines;

(c) determining whether said activator symbol is generated and displayed on one of said displayed reels;

(d) if said activator symbol is generated and displayed on one of said displayed reels:

(i) causing the display device to display a supplemental reel and a plurality of supplemental symbols on the displayed supplemental reel in addition to said displayed plurality of symbols on said displayed plurality of reels, wherein each of said displayed symbols on each of said plurality of reels and each of said displayed supplemental symbols on said supplemental reel are simultaneously displayed, and said plurality of supplemental symbols initially displayed are identical to the symbols on said displayed reel with said generated and displayed activator symbol, (ii) for each wagered on payline, determining if any winning symbol combinations are displayed, wherein said determination includes evaluating each of said symbols generated along said wagered on payline on each of said displayed reels and each of said supplemental symbols displayed along said wagered on payline on said supplemental reel, and wherein said determination occurs prior to generating any of said supplemental symbols on said displayed supplemental reel, (iii) thereafter, generating and displaying a plurality of the supplemental symbols on said displayed supplemental reel, said supplemental symbols generated along the plurality of paylines, (iv) for each wagered on payline, determining if any winning symbol combinations are displayed, wherein said determination includes evaluating each of said symbols generated along said wagered on payline on each of said displayed reels and each of said supplemental symbols additionally and subsequently generated along said wagered on payline on said supplemental reel, and (v) providing any awards associated with any displayed winning symbol combinations to the player, and (e) if said activator symbol is not generated and not displayed on one of said displayed reels:

(i) for each wagered on payline, determining if any winning symbol combinations are displayed, wherein said determination includes evaluating each of said symbols generated along said wagered on payline on said displayed reels, and (ii) providing any awards associated with any displayed winning symbol combinations to the player.

21. The method of claim 20, wherein at least one of said supplemental symbols is a wild symbol.

22. The method of claim 20, wherein a plurality of said supplemental symbols are wild symbols.

23. The method of claim 20, which includes causing the display device to display said supplemental reel adjacent to the displayed reel which generated and displayed the activator symbol.

24. The method of claim 20, which includes repeating steps (a) to (d) at least once if said activator symbol is generated and displayed on one of said displayed reels, wherein the supplemental reel remains displayed for each of said additional games.

25. The method of claim 20, which includes repeating steps (a) to (d) for a period of time if said activator symbol is generated and displayed on one of said displayed reels, wherein the supplemental reel remains displayed for said period of time.

26. The method of claim 20, which includes determining an outcome for each wagered on payline based on said symbols generated along said wagered on payline on said displayed reels, wherein said determination occurs prior to displaying said supplemental reel if the activator symbol is generated and displayed on one of said displayed reels

27. The method of claim 20, wherein said steps are provided to the player through a data network.

28. The method of claim 27, wherein the data network is an internet.

29. A method of operating a gaming device, said method comprising:

(a) enabling a player to place a wager amount on at least one of a plurality of paylines;

(b) causing a display device to display a plurality of symbols on a plurality of displayed reels, wherein said symbols include at least one activator symbol and said symbols are displayed along the plurality of paylines;

(c) determining whether said activator symbol is generated and displayed on one of said displayed reels;

(d) if said activator symbol is generated and displayed on one of said displayed reels:

(i) for each wagered on payline, determining if any winning symbol combinations are displayed, wherein said determination includes evaluating each of said symbols generated along said wagered on payline on said displayed reels prior to displaying a supplemental reel, (ii) causing the display device to display the supplemental reel and a plurality of supplemental symbols on the displayed supplemental reel in addition to said displayed plurality of symbols on said displayed plurality of reels, wherein each of said displayed symbols on each of said plurality of reels and each of said displayed supplemental symbols on said supplemental reel are simultaneously displayed, and wherein said plurality of supplemental symbols initially displayed are different than the plurality of symbols on said displayed plurality of reels, (iii) thereafter, generating and displaying a plurality of the supplemental symbols on said displayed supplemental reel, said supplemental symbols generated along the plurality of paylines, (iv) for each wagered on payline, determining if any winning symbol combinations are displayed, wherein said determination includes evaluating each of said symbols generated along said wagered on payline on each of said displayed reels and each of said supplemental symbols displayed along said wagered on payline on said displayed supplemental reel, and wherein said determination occurs prior to generating any of said supplemental symbols on said displayed supplemental reel, (v) for each wagered on payline, determining if any winning symbol combinations are displayed, wherein said determination includes evaluating each of said symbols generated along said wagered on payline on each of said displayed reels and each of said supplemental symbols additionally and subsequently generated along said wagered on payline on said displayed supplemental reel, and (vi) providing any awards associated with any displayed winning symbol combinations to the player, and (e) if said activator symbol is not generated and not displayed on one of said displayed reels:

(i) for each wagered on payline, determining if any winning symbol combinations are displayed, wherein said determination includes evaluating each of said symbols generated along said wagered on payline on said displayed reels, and (iii) providing any awards associated with any displayed winning symbol combinations to the player.

30. The method of claim 29, wherein at least one of said supplemental symbols is a wild symbol.

31. The method of claim 29, wherein a plurality of said supplemental symbols are wild symbols.

32. The method of claim 29, which includes causing the display device to display said supplemental reel adjacent to the displayed reel which generated and displayed the activator symbol.

33. The method of claim 29, which includes repeating steps (a) to (d) at least once if said activator symbol is generated and displayed on one of said displayed reels, wherein the supplemental reel remains displayed for each of said additional games.

34. The method of claim 29, which includes repeating steps (a) to (d) for a period of time if said activator symbol is generated and displayed on one of said displayed reels, wherein the supplemental reel remains displayed for said period of time.

35. The method of claim 29, wherein said steps are provided to the player through a data network.

36. The method of claim 35, wherein the data network is an internet.

37. A gaming device comprising:

at least one display device;

at least one input device;

at least one processor; and at least one memory device which stores a plurality of instructions, which when executed by the at least one processor, cause the at least one processor to operate with the at least one display device and the at least one input device to control each play of a game by:

(a) enable a player to place a wager on at least one of a plurality of paylines;

(b) display a plurality of symbols on a plurality of reels, wherein each of said plurality of reels includes a plurality of symbols and at least one of said reels includes a first designated quantity of activator symbols; and (c) if at least one activator symbol is generated and displayed on the reels:

(i) display a second designated quantity of supplemental reels in addition to and simultaneously with said displayed plurality of reels, said second designated quantity of supplemental reels each include a plurality of supplemental symbols, wherein a plurality of said supplemental symbols are initially displayed along said plurality of paylines; and (ii) thereafter, for each wagered on payline, determine if any winning symbol combinations are displayed, said determination includes evaluating each of said symbols generated and displayed along said wagered on payline on said displayed plurality of reels and each of said supplemental symbols displayed along said wagered on payline on said second designated quantity of supplemental reels.

38. The gaming device of claim 37, wherein the first designated quantity is greater than one.

39. The gaming device of claim 37, where in the second designated quantity is greater than one.

* * * * *

UNITED STATES PATENT AND TRADEMARK OFFICE

CERTIFICATE OF CORRECTION

PATENT NO. : 7,611,406 B2
APPLICATION NO. : 10/924515
DATED : November 3, 2009
INVENTOR(S) : William S. Fuller It is certified that error appears in the above-identified patent and that said Letters Patent is hereby corrected as shown below:

IN THE CLAIMS:

Column 15, line 65, insert --the-- between the terms “of” and “game”.

Column 19, line 12, replace “includes” with --include--.

Signed and Sealed this

Twentieth Day of July, 2010

David J. Kappos
*Director of the United States Patent and Trademark Office*